United States Patent
Oh et al.

(10) Patent No.: US 8,457,143 B2
(45) Date of Patent: Jun. 4, 2013

(54) METHOD FOR LOSSLESS HANDOVER IN VEHICULAR WIRELESS NETWORKS

(75) Inventors: Ha Young Oh, Seoul (KR); Chong Kwon Kim, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 780 days.

(21) Appl. No.: 12/562,502

(22) Filed: Sep. 18, 2009

(65) Prior Publication Data

US 2011/0013586 A1    Jan. 20, 2011

(30) Foreign Application Priority Data

Jul. 20, 2009 (KR) .......................... 10-2009-0065936

(51) Int. Cl.
*H04L 12/28* (2006.01)

(52) U.S. Cl.
USPC ........................................................ 370/409

(58) Field of Classification Search
USPC ........................................................ 370/409
See application file for complete search history.

(56) References Cited

U.S. PATENT DOCUMENTS

| | | | | |
|---|---|---|---|---|
| 7,813,319 B2* | 10/2010 | Dutta et al. | ................... | 370/331 |
| 2005/0078635 A1* | 4/2005 | Choi et al. | .................... | 370/331 |
| 2005/0163080 A1* | 7/2005 | Suh et al. | ....................... | 370/331 |

* cited by examiner

*Primary Examiner* — Mark Rinehart
*Assistant Examiner* — Maharishi Khirodhar
(74) *Attorney, Agent, or Firm* — Kile Park Reed & Houtteman PLLC (57) ABSTRACT

A lossless handover method in vehicular wireless networks is disclosed which is capable of reducing a handover delay and reducing overhead caused by duplicate address detection (DAD) for a new Care-of-Address (CoA) by dividing a handover process into handover at road-sections and handover at intersections. In the handover method, a vehicle continues to use an original CoA configured at an original access router at road-sections even though an AR is changed, thereby reducing a handover delay. A new CoA is configured only at intersections to reduce a binding update time of a home agent which is remotely present in an external network at road-sections. When performing the DAD for a new CoA at intersections, since the vehicle performs the DAD as a background process while performing communication using an original CoA, overhead caused by the DAD can be reduced.

4 Claims, 14 Drawing Sheets

(a) Packet Delay when MN moves from AR1 to AR2

FIG.7b (b) Out-of Sequence problem

FIG.7c (c) Packet Delay expanded from(a)

METHOD FOR LOSSLESS HANDOVER IN VEHICULAR WIRELESS NETWORKS

BACKGROUND OF THE INVENTION

1. Field of the Invention

The present invention relates to a vehicular mobile Internet protocol (VMIPv6) based on Internet Protocol version 6 (IPv6) in vehicular wireless networks, and more particularly to a lossless handover method in vehicular wireless networks, which is capable of reducing a handover delay by continuously maintaining an original Care-of-Address (CoA) at road-sections even though an Access Router (AR) is changed and reducing overhead caused by duplicate address detection (DAD) by performing the DAD as a background process to confirm whether a new CoA is duplicated while performing communication using the original CoA at intersections.

2. Description of the Related Art

In recent years, with the increasing demand on applications such as traffic surveillance, traffic congestion control, vehicle location and navigation, electronic toll collection, mobility and infortainment, the interests in Vehicular Wireless Networks and Vehicular Intelligent Transportation Systems (V-Winet/V-ITS) are growing fast.

In V-Winet/V-ITS, drivers in a vehicle may use broadband wireless technologies for seamless interactive and intelligent services via vehicle to vehicle or vehicle to infrastructure communications. One of the main challenges in V-WINET/V-ITS is to support seamless streaming services such as traffic, news, travel, shopping, and even video and music by supporting fast and robust handovers between roadside wireless access networks. Furthermore, the core network of the roadside wireless access networks is evolving into an all-IP based network.

Accordingly, Mobile IPv6 (MIPv6) has become a global mobility solution of the Internet Engineering Task Force (IETF) that provides host mobility management. However, the long handover latency and the packet loss problem of MIPv6 depreciates Quality-of-Service (QoS) for multimedia service applications.

To reduce the handover latency and solve the packet loss problem in the MIPv6, the fast handover for the MIPv6 (FMIPv6) was proposed by IETF. FMIPv6 tries to reduce the address resolution time through address pre-configuration, i.e., it provides the fast IP connectivity as soon as a new link is established by predicting the handover and conducting the DAD procedure prior to the Layer-2 handover.

However, the vehicle's connection time to the roadside access router is shorter in V-Winet/V-ITS compared with that of the general MN (Mobile Node) in cellular networks due to the fast moving speed of the vehicles. Moreover, the FMIPv6 is not robust for multimedia streaming especially in V-Winet/V-ITS. In FMIPv6, a vehicle is pre-configured with only one new Care-of Addresses (nCoA) before it is attached to the new link. Therefore, this address pre-configuration is useless if the vehicle moves to a visiting network which is different from its handover predicition. In this case, FMIPv6 needs to take the full handover procedure of MIPv6, so the handover latency increases undesirably.

Some work has already tried to improve MIPv6 and FMIPv6. To achieve fast handovers in IPv6 mobility, Gogo et al. proposed the L3-driven fast handover mechanism using the abstract link layer information and primitives. It is independent of the link layer (L2) protocols and devices. Through the L2 primitives, the network layer (L3) can know the upcoming of L2 handover and L3 can prepare for the L3 handover in advance. As a result, the total handover delay is dramatically reduced.

The L2 handover means that a MN switches from the pAP (previous Access Point) to the nAP (new Access Point) and the L3 handover means that a MN switches from the pAR (previous Access Router) to the nAR (new Access Router).

To present an enhanced handover mechanism, Hsief et al. also utilize the additional primitives and parameters by newly adding them to the media independent handover (MIH) services defined in the IEEE 802.21. This scheme can reduce the handover latency by removing the router discovery time and design the network cost-effectively by reducing the coverage overlap between adjacent cells.

To eliminate the Duplicate Address Detection (DAD) delay, Leu and Mark and Campbell et al. proposed a fast handover mechanism using the fast neighbor discovery and the DAD for fast moving MNs. They modified the Neighbor Cache with a look up algorithm for a quicker DAD checking speed. Therefore, it solves the shortcomings of the conventional DAD when a router has more than two links.

The optimistic DAD (oDAD) eliminates the DAD delay based on the premise that DAD is far more likely to succeed than fail. To do this, an optimistic MN modifies the standard IPv6 operation rules while keeping backward interoperability. However, although this optimistic approach reduces the handover latency in non-collision cases, if an address collision occurs, it can incur some penalty to both an optimistic MN and a rightful owner of the address. Therefore, oDAD cannot be the unique solution for the DAD problem. Furthermore, since it is a complete end-to-end approach, only a MN can initiate the registration process with the new optimistic address.

To realize the fast vertical handover, Ishibashi et al. provide the virtual MAC address scheme. That is, to reduce the L3 handover, the virtual MAC address becomes a unique identifier for a MN within the Mobile Ethernet. However, this scheme has limits on implementation and needs the additional layer.

In order to support the real-time applications in Vehicular Ad-hoc Networks (VANETs), Maria Fazio and Mario Gerla proposed a Leader-based scheme that exploits the topology of VANETs and a distributed DHCP service to guarantee the fast and stable address configuration. However, it simply assumes the use of a DHCP server and suffers from the control message overhead problem since it is a proactive protocol. Additionally, it still needs the DAD when a vehicle changes the scope of its leader.

Qazi Bouland Mussabbir and Wenbing Yao optimized the handover procedure of FMIPv6 by using the IEEE 802.21 MIH services in VANETs. They introduced an "Information Element Container" to store the static and dynamic Layer 2 (L2) and Layer 3 (L3) information of neighboring access networks and proposed to use a special cache maintained by the vehicle/AR to reduce the anticipation time in FMIPv6, thus increasing the probability of the predictive mode of FMIPv6.

Jong Min Lee proposed a scheme called the global mobility management (GMM) for the inter-VANET handover of vehicles. The proposed scheme supports the fast handover process using the L2 triggering and the route optimization for packet transmission.

Chung-Ming Huang proposed the packet forwarding control (PFC) scheme in VANETs to select a common ahead point (CAP) as the tunnel source to forward packets. The CAP can forward packets to the pAR and the nAR with a short transmission path. During a vehicle handover, packets sent from the data center to vehicles can be forwarded through the CAP to the nAR directly without having to travel to the pAR. As a result, packets can be sent through a shorter delivery path during handover in the proposed PFC scheme. However, this scheme does not work if the CAP does not exist in the middle of ARs and can not reduce the number of DADs when the vehicle changes ARs.

Marc Bechler proposed MMIP6, a communication protocol that integrates multi-hop IPv6-based vehicular ad hoc networks into the Internet. While the existing approaches focus on small-scale ad hoc networking scenarios, MMIP6 is highly optimized for scalability and efficiency. However, MMIP6 is based on the principles of Mobile IPv4 and does not provide the interoperability with previous mobility schemes such as IPv6, FMIPv6 and HMIPv6.

Yuh-Shyan Chen proposed a NEMO protocol for VANETS. On a freeway, since every car is moving in a fixed direction with high moving speed, the car adopting this protocol can acquire an IP address from the VANET through vehicle to vehicle communications. The vehicle can rely on the assistance of the front vehicle in executing the pre-handover procedure or it may acquire its new IP address through multi-hop relays from the car on the lanes of the same or opposite direction and thus reduces the handover delay and maintains the connectivity to the Internet.

Todd Arnold also proposed the IP Passing Protocol to reduce the overhead of obtaining an IP address to under one-tenth of a second. This is done without modifying either the DHCP or the AP software. However, these previous schemes still do not satisfy the delay of the seamless services in V-Winet/V-ITS and consider the handover delay under the imperfect prediction of the vehicle and the out-of sequence problem.

SUMMARY OF THE INVENTION

Therefore, the present invention has been made in view of the above problems, and it is an object of the present invention to provide a lossless handover method in vehicular wireless networks, for reducing a handover delay and eliminating packet loss by continuously maintaining an original Care-of-Address (CoA) at road-sections even though an AR is changed.

It is another object of the present invention to provide a lossless handover method in vehicular wireless networks, for reducing a binding update time of a home agent (HA) which is remotely present in an external network at road-sections as a result of creating a new CoA only at intersections.

It is a further object of the present invention to provide a lossless handover method in vehicular wireless networks, for reducing overhead caused by DAD by performing the DAD as a background process to confirm whether a new CoA is duplicated while performing communication using an original CoA at intersections.

A lossless handover method in vehicular wireless networks, the method comprising a handover process of performing handover at road-sections using an original Care-of-Address (oCoA) configured at an original access router (oAR) to which a vehicle (a mobile node) first belongs when the vehicle initiates communication in a wireless network, and performing, at intersections, duplicate address detection (DAD) for a new Care-of-Address (nCoA) caused by a change in access routers (ARs) as a background process.

The handover process includes a road-section handover process of performing, at the vehicle, communication while moving at high speed by configuring the oCoA for communication by access with the oAR through the wireless network, and performing handover to a changed access router (AR) using the oCoA at road-sections.

The handover process includes an intersection handover process of implementing the DAD for the nCoA for communication with an AR to be changed as a background process while performing communication using the oCoA at intersections, and performing handover using the nCoA when the nCoA is usable.

The road-section handover process includes:
configuring, at the vehicle, the oCoA for communication by accessing the oAR, judging that handover is initiated when sensing that a signal of an access point (AP) within the oAR becomes weak while performing communication, and transmitting a modified Router Solicitation message for proxy (mRtSolPr) to the oAR;

receiving, at the oAR, a response message, and requesting the oAR to store data by transmitting a message indicating a last packet to the oAR when the vehicle escapes a management area of the oAR;

if a link up message indicating that a signal of a new access router (nAR) is sensed is received, transmitting a modified Unsolicited Neighbor Advertisement message (mUNA) including the oCoA which has been used in the oAR to the nAR; and requesting, at the nAR receiving the mUNA, the oAR to transmit the stored data to the vehicle.

The road-section handover includes performing handover to the nAR using the oCoA.

The intersection handover process includes:
configuring, at a vehicle, the CoA for communication by accessing the oAR, judging that handover is initiated when sensing that a signal of an access point (AP) within the oAR becomes weak while performing communication, and transmitting a modified Router Solicitation message for proxy (mRtSolPr) to the oAR;

receiving, at the oAR, a response message, and requesting the oAR to store data by transmitting a message indicating a last packet to the oAR when the vehicle escapes a management area of the oAR;

if a link up message indicating that a signal of a new access router (nAR) is sensed is received, transmitting a modified Unsolicited Neighbor Advertisement message (mUNA) including the oCoA which has been used in the oAR to the nAR;

requesting, at the nAR receiving the mUNA, the oAR to transmit the stored data to the vehicle; and performing, at the vehicle, communication with the nAR using the oCoA, performing the DAD for the nCoA as a background process, and registering the nCoA to a home agent.

The intersection handover includes performing handover to the nAR using the nCoA.

In accordance with an aspect of the present invention, it minimizes the handover initiation time because, at road-sections, the vehicle consistently maintains the original CoA (oCoA) configured at the original Access Router (oAR). The data packets destined to the vehicle are forwarded from the oAR to the nAR, and finally to the vehicle. Meanwhile, at the intersections, it creates a nCoA to limit the data forwarding hops from the oAR to the nAR. However, it reduces the IP-reconfiguration delay due to Duplicate Address Detection (DAD) and Home Agent (HA) bindings at the intersection because the DAD procedure is performed as a background process while still using the oCoA. In addition, unlike FMIPv6 that makes a new CoA before the actual vehicle handover through prediction, VMIPv6 makes a new CoA after the vehicle handover to prevent wrong prediction of FMIPv6.

BRIEF DESCRIPTION OF THE DRAWINGS

The above and other objects, features of the present invention will be more clearly understood from the following detailed description taken in conjunction with the accompanying drawings, in which.

DETAILED DESCRIPTION OF THE PREFERRED EMBODIMENTS

Exemplary embodiments in accordance with the present invention will now be described in detail with reference to the accompanying drawings.

Figure 1:
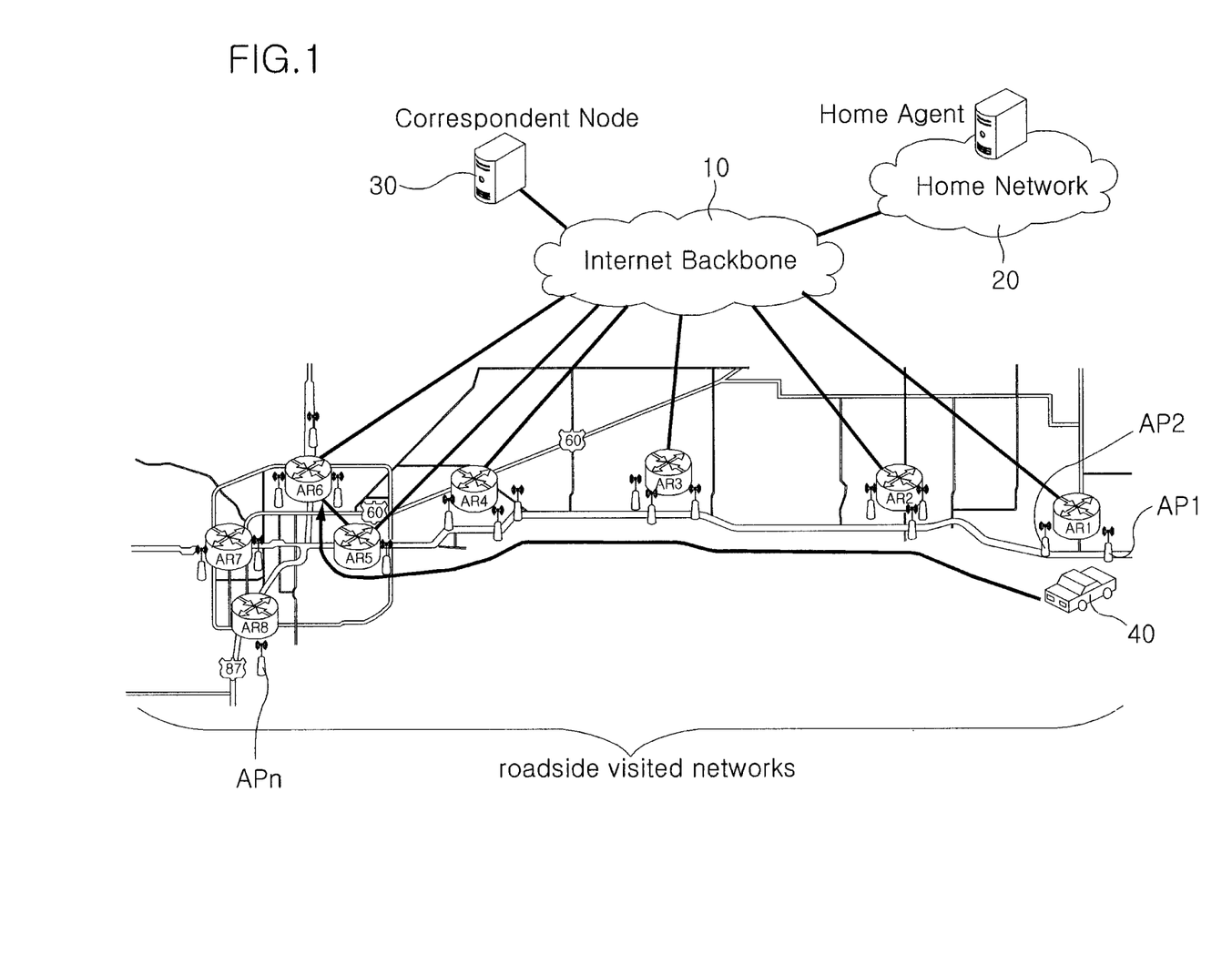
FIG. 1 is an architecture with roadside wireless access networks in V-WINET/V-ITS

In Vehicular Wireless Networks and Vehicular Intelligent Transportation Systems (V-Winet/V-ITS), road side units (RSUs), such as access routers (ARs) AR1 to AR8 and access points (APs) AP1, AP2, and APn included in the ARs, are located along road sides or at intersections, as shown in FIG. 1. Such a network is called a roadside visited network (RVN). An Internet backbone 10 serves to connect the RVN comprised of ARs and APs to a home network 20. The home network 20 refers to a location where a vehicle 40 initially creates an IPv6 address which can be identified only in a wireless network. The home network 20 may be called a home agent (HA). The vehicle 40 may refer to a mobile node including a wireless communication module which communicates with the APs and may be a terminal installed in a vehicle, for example, a notebook. Hereinafter, a vehicle denotes a mobile node including a wireless communication module.

The 128 bit IPv6 home address consists of the prefix of the home network (64 bits) (20) and the MAC address of the vehicle (64 bits). The home address is a unicast routable address assigned to the vehicle, and is used as a permanent address. Standard IP routing mechanisms will deliver packets destined for the home address of a vehicle. The domain of a roadside network is comprised of several ARs and wireless APs with one of which a vehicle can make a connection. It is assumed that an AR is connected to several APs via different interfaces at the AR. Each AR has its own network prefix so that it can be distinguished from other ARs.

In general, a vehicle (40) can send and receive packets with its Home Agent (HA) (20) or Correspondent Node (CN) (30) using its CoA. While the vehicle is away from its home network, it registers its CoA at its HA (20), which is a router in the vehicle's home network (20). The HA intercepts packets destined to the vehicle's home address, encapsulates them, and tunnels them to the vehicle's registered CoA. The association between a vehicle's home address and its CoA is called binding. While the vehicle is away from its home network, it registers its new CoA by sending a Binding Update message to the HA. The HA replies by sending a Binding Acknowledgement message. The CN is a mobile or stationary peer node with which a vehicle is communicating. CoA is a unicast routable address associated with a vehicle while the vehicle visits a new network. CoA is composed of the prefix of the nAR in a new visited network and the MAC address of the vehicle. CoA is configured after passing DAD. DAD dominates most part of the handover latency as it requires time in the order of seconds to detect whether the vehicle's new CoA is duplicated or not.

Therefore, to reduce aforementioned handover delay, it is an object of the present invention to provide a seamless and robust vehicular handover scheme which employs the oCoA preservation and the background DAD procedure in roadside wireless networks.

According to the present invention, the vehicle carries out handover at road-sections using a CoA configured at an original AR while performing communication through a wireless network and carries out handover at intersections by duplicate address detection (DAD) for a new CoA (nCoA) caused by a change in an AR as a background process.

Such a handover process includes two scenarios: handover at road-sections and handover at intersections. In the handover at road-sections, a vehicle moving at high speed accesses an AR through a wireless network to configure a CoA for communication and performs handover to a changed AR using the configured CoA at road-sections. In the handover at intersections, the vehicle performs a background DAD procedure for an nCoA to communicate with an AR to be changed while performing communication using the configured CoA. If the nCoA is usable, the vehicle performs handover using the nCoA.

Figure 2A:
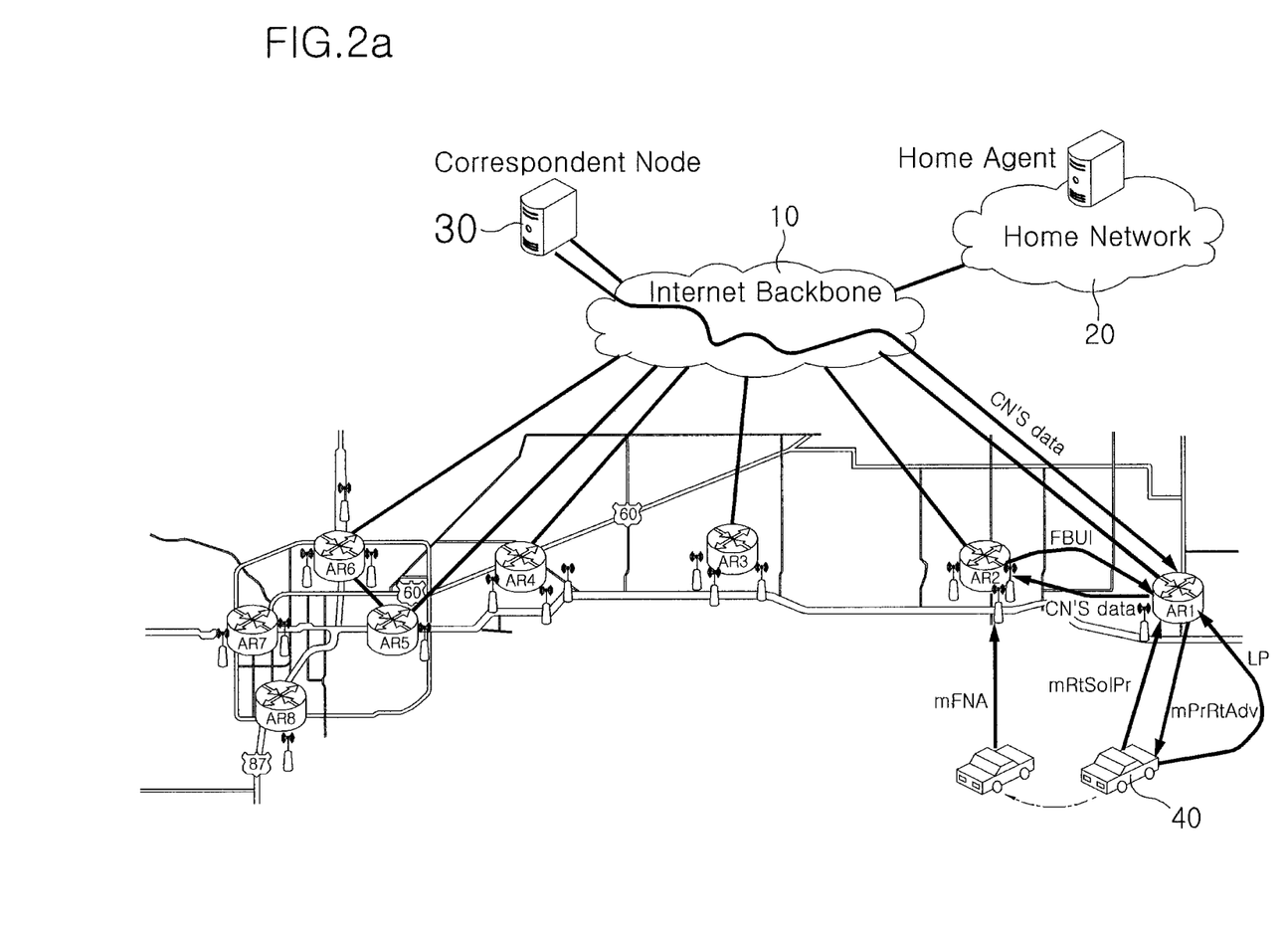
FIG. 2(a) is an architectural view for a seamless and robust handover scheme when the vehicle moves from AR1 to AR2 with the oCoA in V-WINET/V-ITS
Figure 2B:
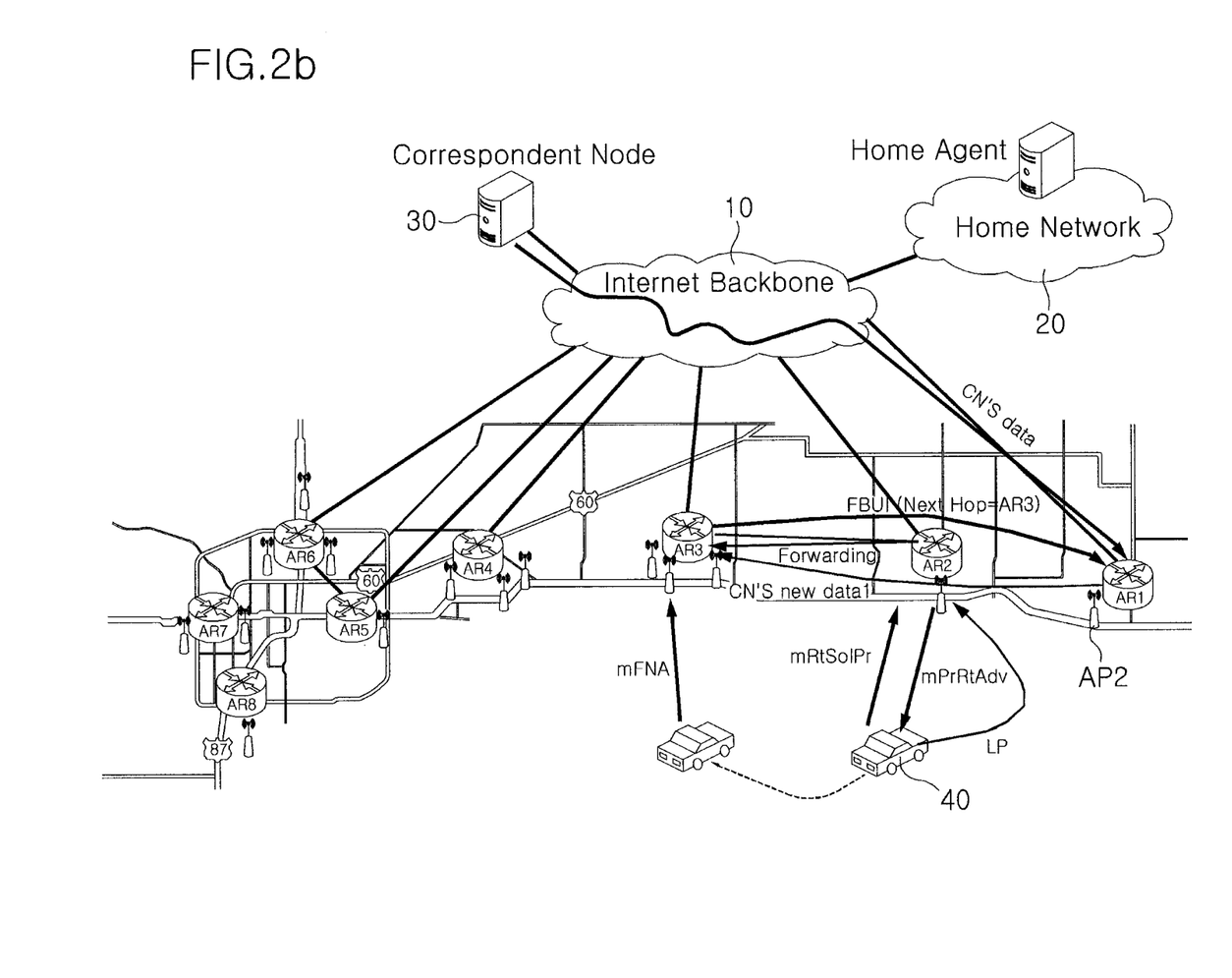
FIG. 2(b) is an architectural view for a seamless and robust handover scheme when the vehicle moves from AR2 to AR3 with the oCoA in V-WINET/V-ITS
Figure 2C:
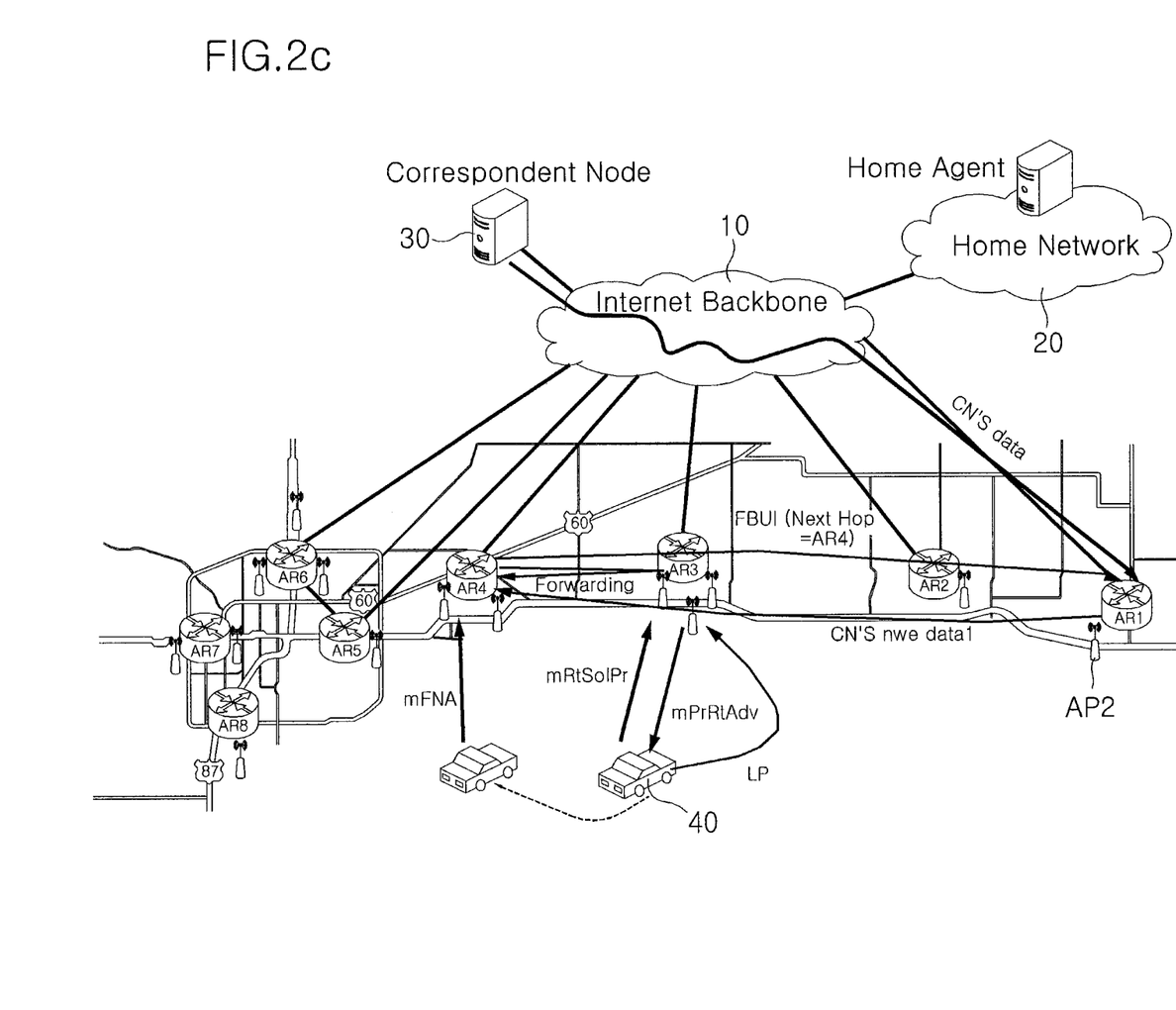
FIG. 2(c) is an architectural view for a seamless and robust handover scheme when the vehicle moves from AR3 to AR4 with the oCoA in V-WINET/V-ITS

In the handover at road-sections in which a vehicle changes an AR while moving at road-sections, the vehicle continues to use an original CoA (oCoA) configured at an original AR (oAR) even though the vehicle changes ARs as shown in FIGS. 2a to 2c. Accordingly, a DAD procedure for an nCoA can be omitted and therefore a handover delay can be greatly reduced. Consequently, even if the vehicle belongs to a new AR (nAR), data is transmitted using the oCoA through the oAR. The oAR refers to an AR to which a vehicle first belongs and the nAR refers to an AR to which a vehicle newly belongs due to movement of the vehicle. For example, in FIG. 2a, AR1 corresponds to an oAR and AR2 corresponds to an nAR. A previous AR (pAR) refers to an AR to which a vehicle belongs immediately before moving to an nAR. In FIG. 2a, AR1 corresponds to an oAR and simultaneously to a pAR. In FIGS. 2b, AR1, AR2, and AR3 correspond to an oAR, a pAR, and an nAR, respectively. In FIGS. 2c, AR1, AR3, and AR4 correspond to an oAR, a pAR, and an nAR, respectively.

Figure 2D:
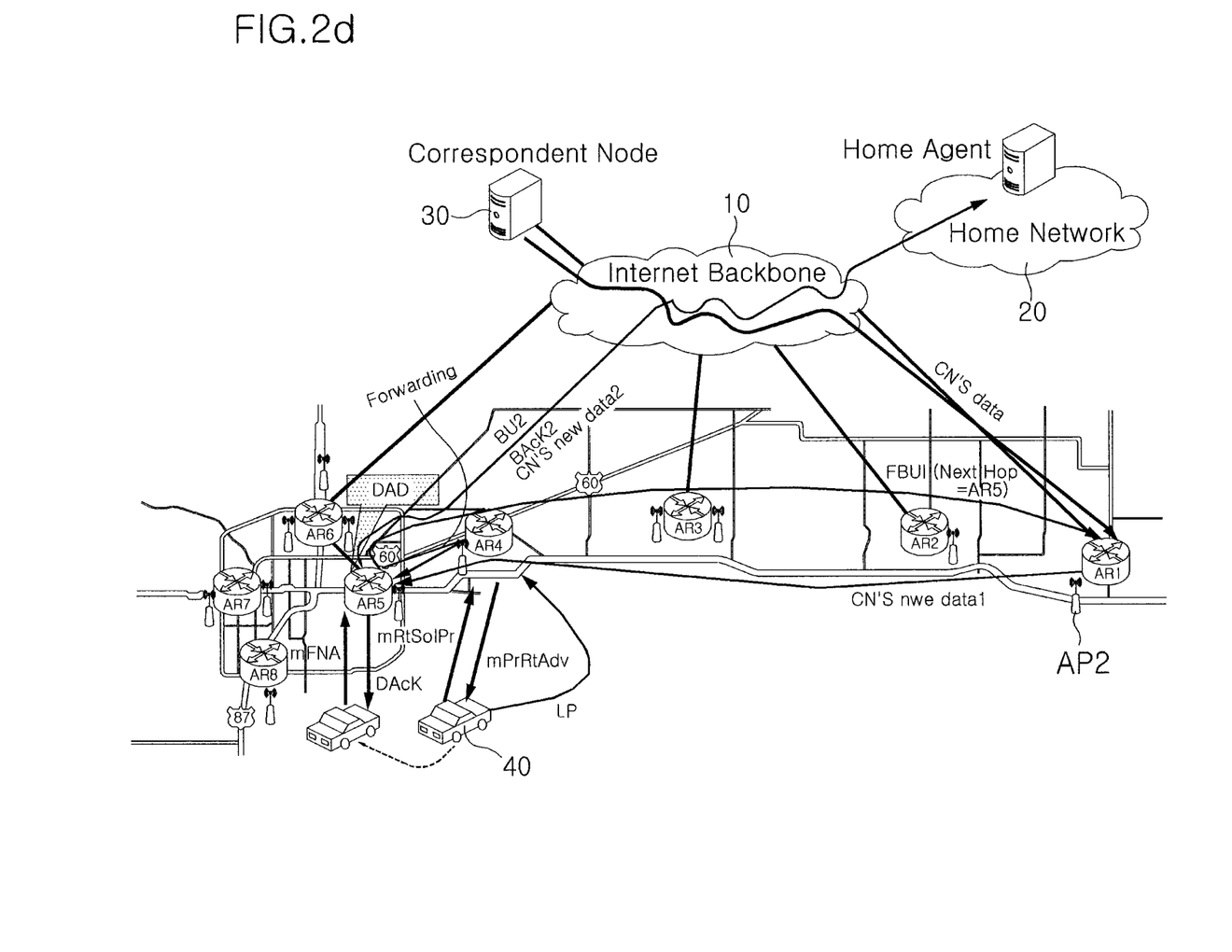
FIG. 2(d) is an architectural view for a seamless and robust handover scheme when the vehicle moves from AR4 to AR5 with the oCoA and the background DAD for a nCoA in V-WINET/V-ITS

In the handover at intersections, a vehicle changes ARs at an intersection as shown in FIG. 2d. In this scenario, since a distance between an oAR and an nAR becomes far away as the vehicle passes through an intersection, an nCoA is configured by DAD in order to reduce a data reception path of the vehicle. However, since the vehicle performs DAD for the nCoA as a background process at an intersection while using an oCoA until the nCoA is configured, a handover delay can be reduced. For seamless data transmission from an oAR to an nAR, the present invention introduces host-specific routing. Host-specific routing refers to a scheme for permitting an AR to receive a packet having a prefix of a predetermined AR even though the AR receives a packet having a different prefix from a prefix thereof. Therefore, when a vehicle moves to an nAR from an oAR, even if the vehicle continues to use the oAR, the nAR can receive a prefix of the oAR through host-specific table management, thereby supporting seamless communication.

Figure 2E:
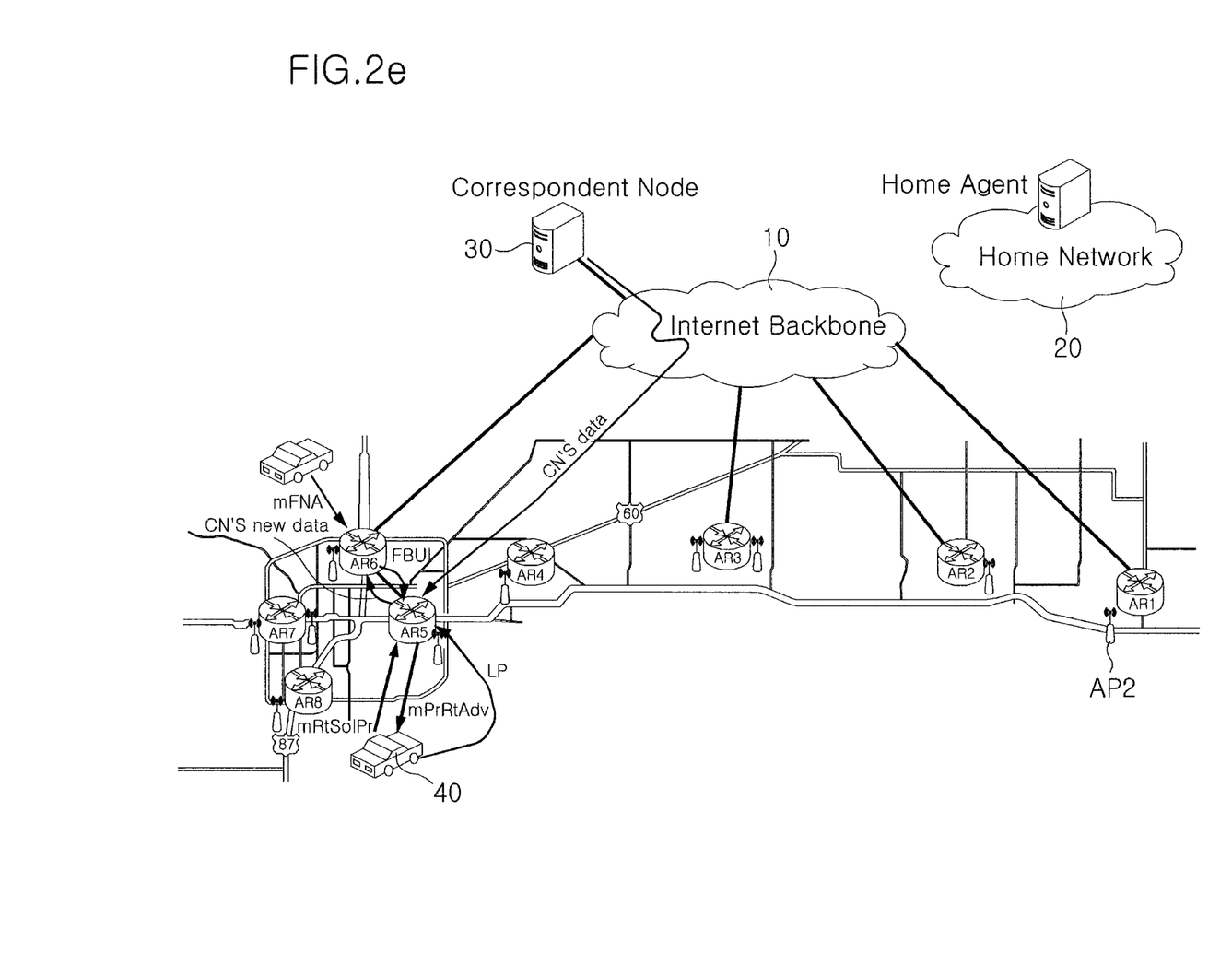
FIG. 2(e) is an architectural view for a seamless and robust handover scheme when the vehicle moves from AR5 to AR6 with the oCoA in V-WINET/V-ITS

FIG. 2e is a view showing an environment in which a vehicle configures an nCoA at an intersection and consecutively performs the first scenario using the nCoA as an oCoA.

Hereinafter, a handover procedure (VMIPv6 procedure) at road-sections will be described.

Figure 3A:
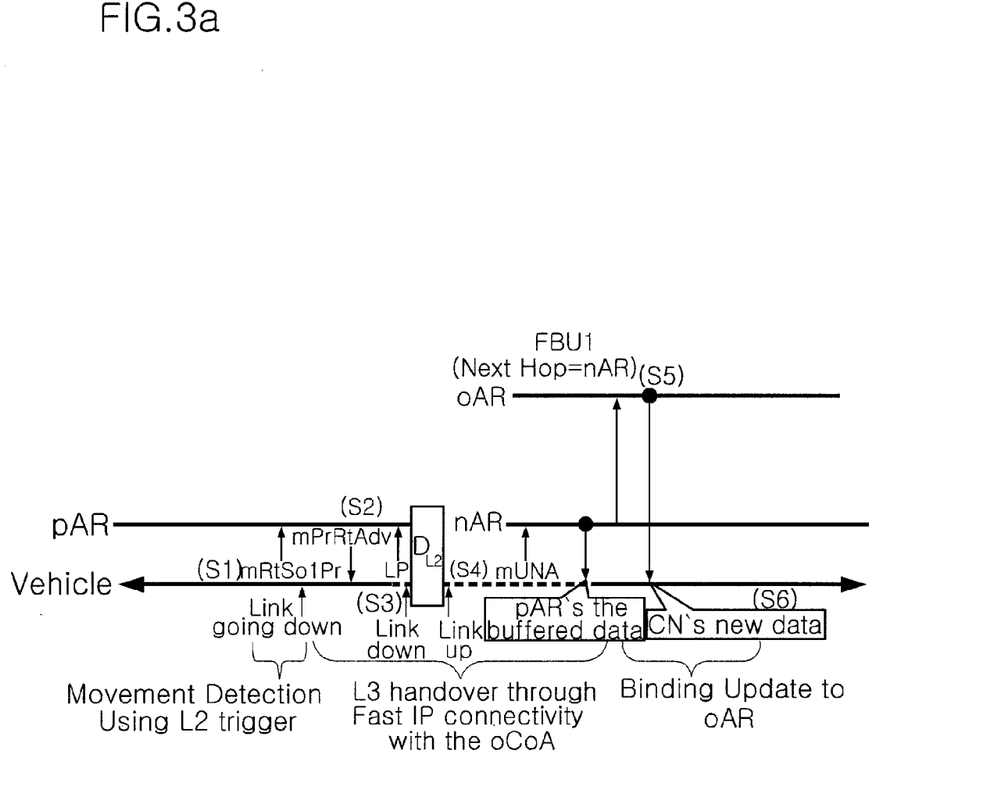
FIG. 3(a) is a flow diagram representing handover procedure of VMIPv6 at road-sections

As shown in FIG. 3a, the handover procedure includes movement detection using an L2 trigger, in which a vehicle senses the start of handover by detecting a radio signal of an AP within an nAR, L3 handover through fast IP connectivity with an oCoA, in which the vehicle maintains fast connectivity using an oCoA within the nAR, and binding update to oAR, in which the vehicle requests an oAR to transmit data to the nAR. In FIG. 3a, 'link going down' refers to a hint message indicating that an L2 of the vehicle informs an L3 that the vehicle starts to move and a signal of an AP of a pAR to which the vehicle belongs becomes weak. The vehicle can recognize that handover is initiated and transmits a modified Router Solicitation message for proxy (mRtSoIPr) to the pAR (step S1). The pAR receiving the mRtSoIPr transmits a modified Proxy Router Advertisement message (mPrRtAdv) to the vehicle (step S2). The vehicle transmits a message requesting the pAR to store data by transmitting a last packet (LP) to the pAR when the vehicle is almost away from an area of the pAR and can no longer receive data from the pAR (step S3). If the vehicle is completely away from the area of the pAR, the L2 of the vehicle transmits, to the L3, a link down message indicating that the signal of the AP of the pAR has been disconnected and transmits, to the L3, a link up message indicating that a signal of an AP of an nAR is detected. As soon as the vehicle belongs to the nAR, the vehicle transmits a modified Unsolicited Neighbor Advertisement message (mUNA) including an oCoA configured at an oAR to the nAR (step S4). The nAR receiving the mUNA requests the oAR to transmit, to the vehicle, data stored in the pAR, which has not been received during handover as the vehicle moves to the nAR by transmitting a Fast Binding Update 1 message (FBU1) to the oAR (step S5). Here, since the vehicle uses the oCoA rather than performing a DAD procedure for an nCoA, rapid L3 handover is possible and data newly transmitted from a correspondent node (CN) 30 can be seamlessly received. In FIG. 3a, a bold line represents time during which the vehicle does not receive data due to temporal disconnection of a link while performing handover.

Figure 3B:
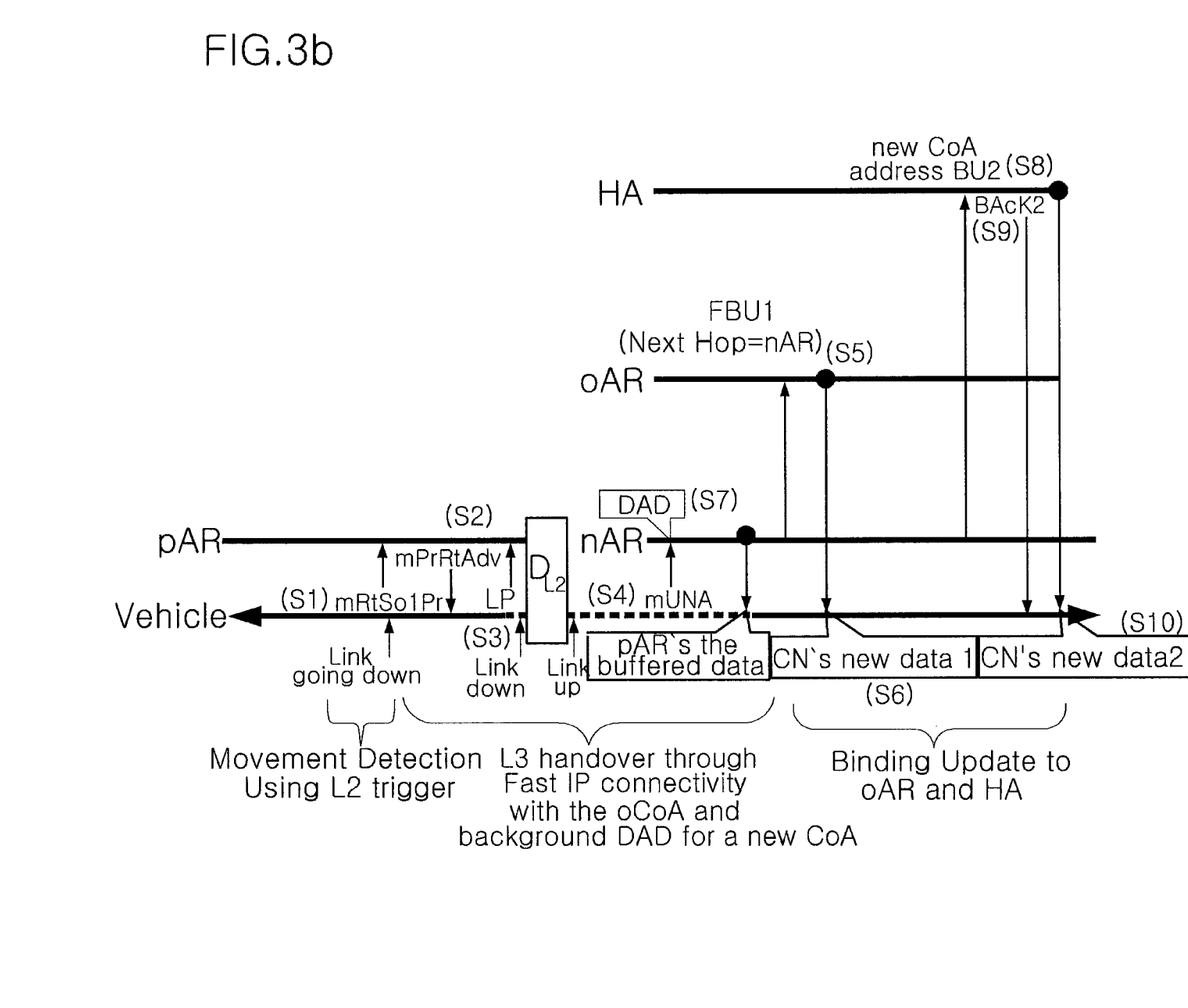
FIG. 3(b) is a flow diagram representing handover procedure of VMIPv6 at intersections

Next, the second scenario includes a background DAD process (step S7) for an nCoA and a binding update process (steps S8 to S10) for registering the nCoA to an HA 20, in addition to the handover procedure (steps S1 to S6). As described previously, since a vehicle performs a background DAD procedure to use the oCoA and simultaneously to configure the nCoA, an additional handover delay does not occur. Namely, the handover delay is the same as shown in FIG. 3a.

Figure 4:
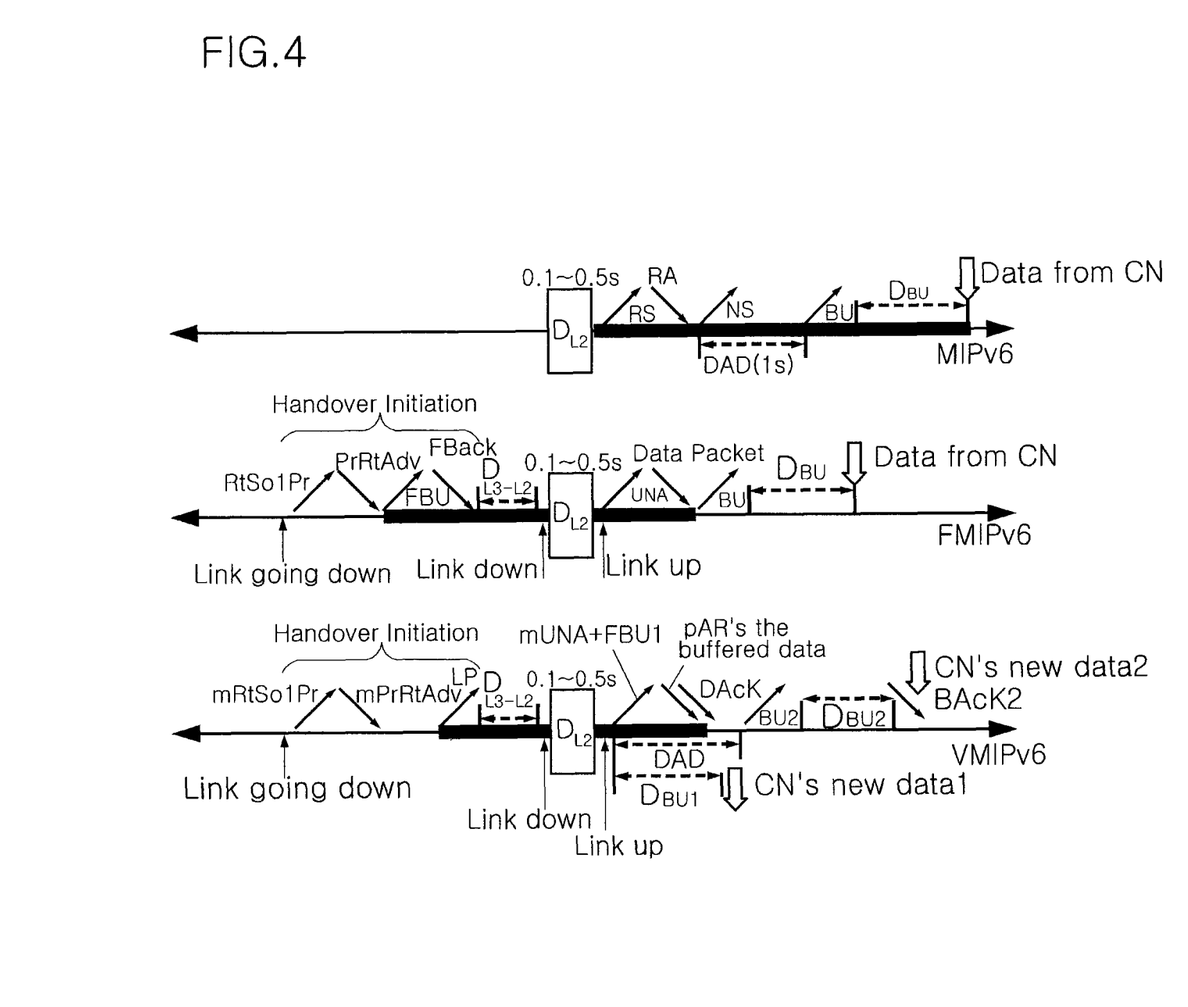
FIG. 4 is a flow diagram representing handover procedure of MIPv6, FMIPv6, and VMIPv6

To evaluate capabilities of a lossless handover method in V-Winet/V-ITS according to the present invention, handover delays of MIPv6, FMIPv6, and VMIPv5 are compared in FIG. 4. As described previously, red lines denote handover delays generated when a vehicle moves to a new area. A start point of the red line denotes a time point when a vehicle moves from an area of a pAR to which the vehicle has belonged. A last point of the red line denotes a time point when a vehicle first receives a packet by performing communication using a CoA after the vehicle belongs to an nAR.

Figure 5:
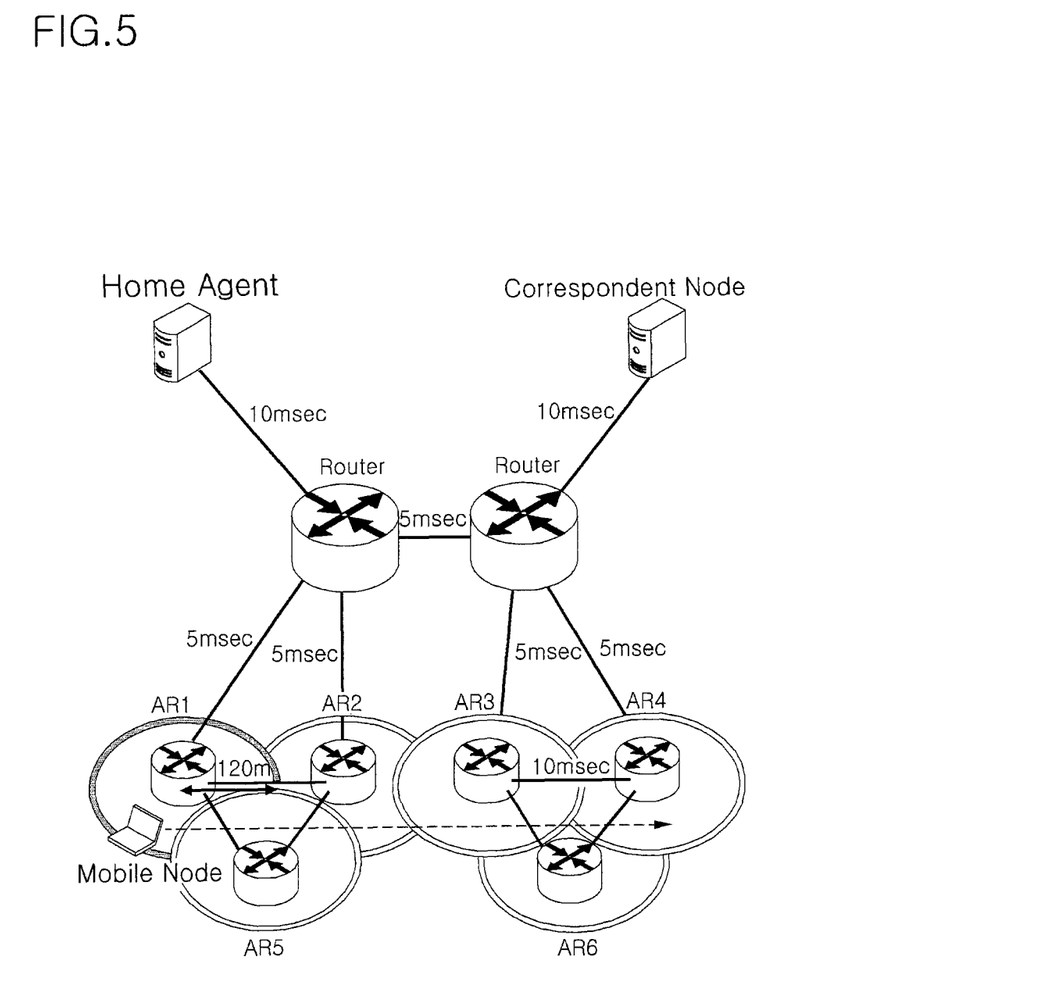
FIG. 5 shows simulation network topology
Figure 6:
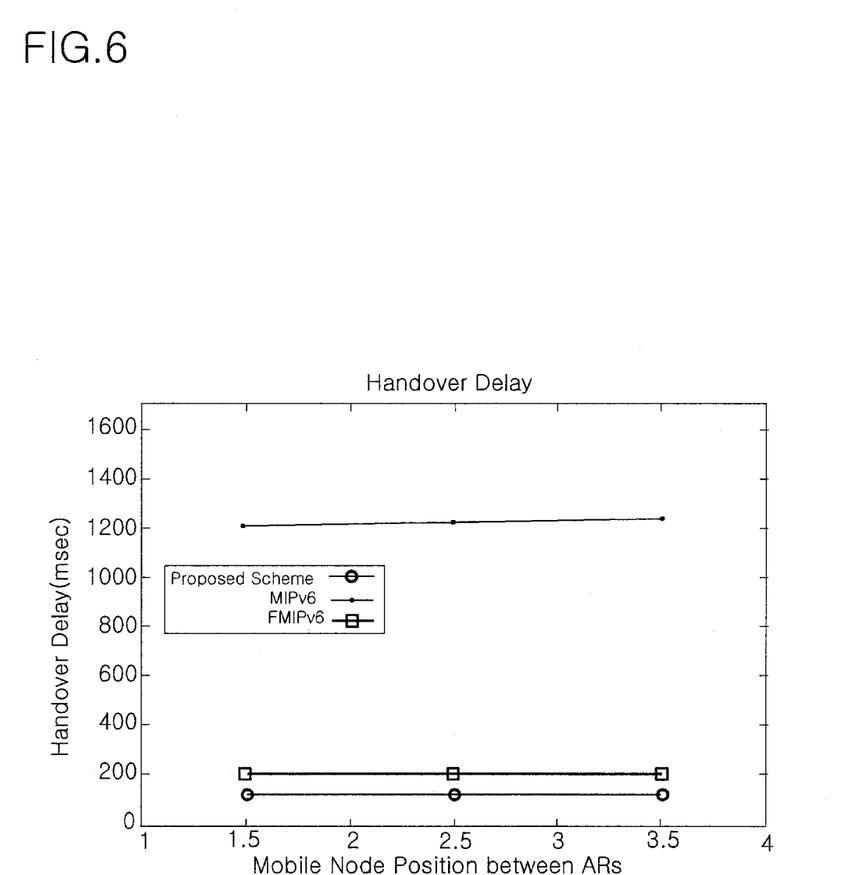
FIG. 6 is a graph showing handover delay of MIPv6, FMIPv6 and VMIPv6

A network topology as shown in FIG. 5 is assumed for simulation.

Figure 7A:
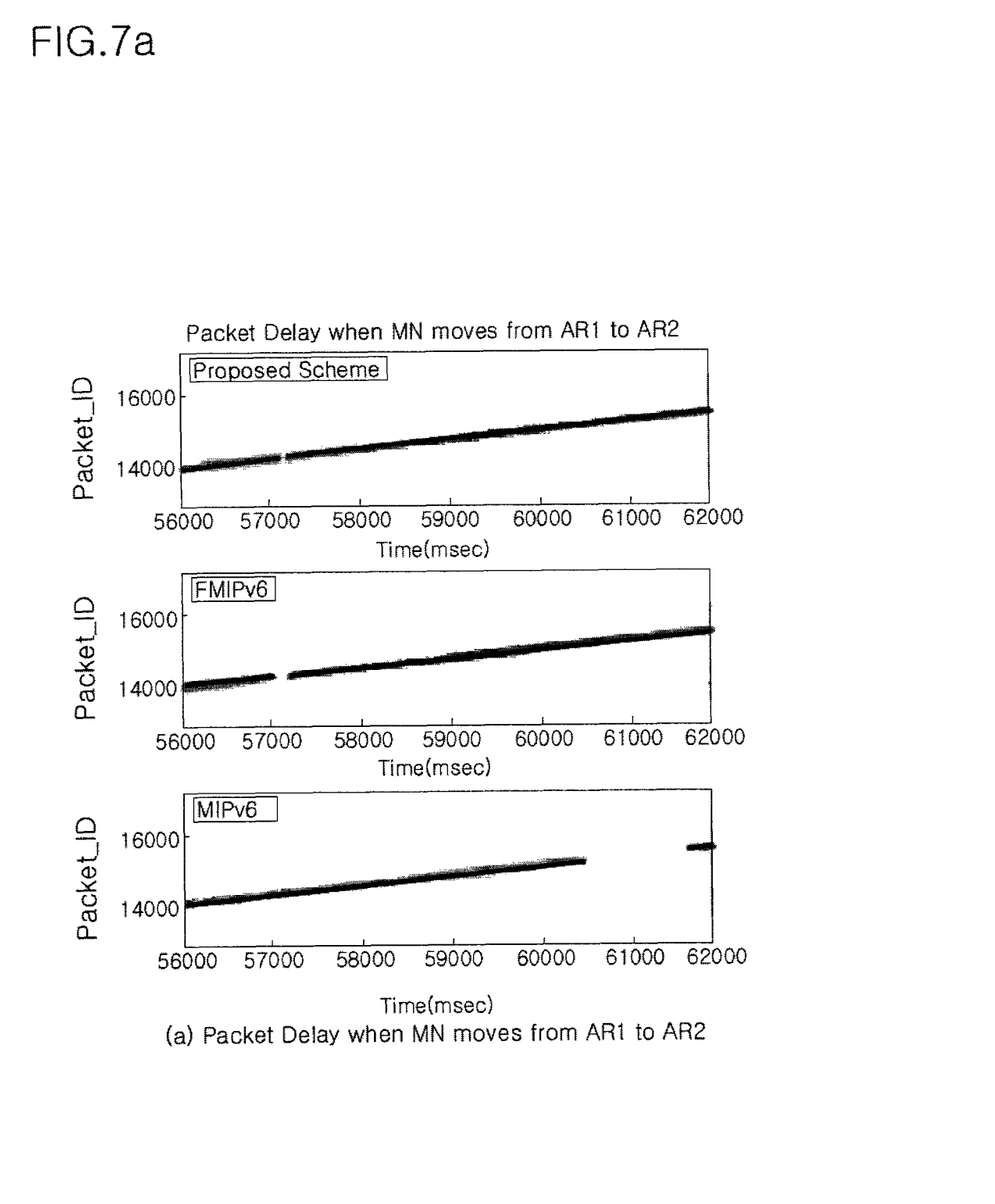
FIG. 7(a) is a graph showing packet delay of MIPv6, FMIPv6, and VMIPv6 when the vehicle moves from AR1 to AR2
Figure 7B:
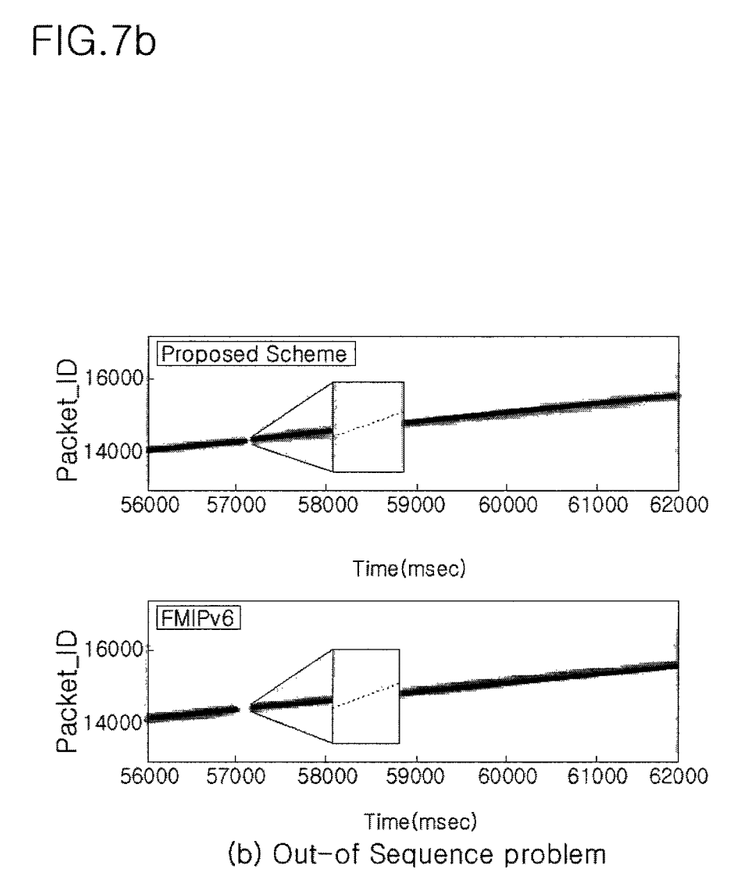
FIG. 7(b) is a graph showing out-of sequence problem when the vehicle moves from AR1 to AR2
Figure 7C:
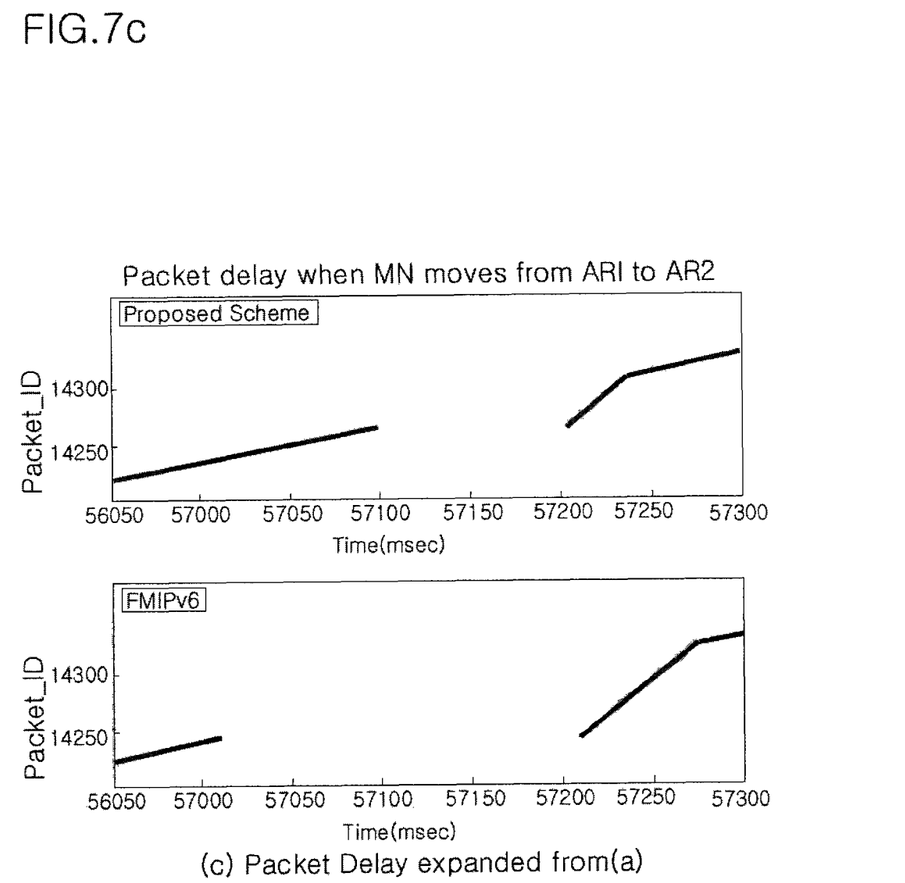
FIG. 7(c) is a graph showing packet delay expanded from (a) when the vehicle moves from AR1 to AR2

A vehicle, which is a mobile node, moves to AR4 from AR1. It is assumed that a distance between one AR AR1 and another AR AR2 is 120 m, a link delay between an AR and an upper router and between routers is 5 msec, and a link delay between a router and an HA of an external network and between a router and a CN is 10 msec. Here, the link delay includes a propagation delay, a processing delay, a transmission time, and a queuing delay. The CN continues to transmit 2-Mbps CBR/UDP multimedia traffic to a moving vehicle. As a result, a handover delay of VMIPv6 proposed in the present invention is the smallest as shown in FIGS. 6 and 7a to 7c. According to the present invention, since an nAR uses buffers for discriminating between a packet received from a pAR via an oAR and a packet received from a CN, an out-of-sequence problem as shown in FIG. 7b can be solved.

In conclusion, with the increasing demand on applications such as traffic surveillance, traffic congestion control, vehicle location and navigation, electronic toll collection, mobility and infortainment, the need to support seamless and robust multimedia services in Vehicular Wireless Networks and Vehicular Intelligent Transportation Systems (V-Winet/V-ITS) is growing fast. To support seamless handover, several schemes such as MIPv6 and FMIPv6 and micro-mobility protocols were developed. However, these schemes are not suitable for VANET applications because of such problems as the long handover latency, the packet loss problem, the handover failure and the out-of sequence problem. In the V-WINET/V-ITS, the possibility of service failures is even more severe due to the vehicles' high mobility and sudden direction changes. Therefore, in accordance with the present invention, it proposes a robust handover scheme with the oCoA preservation and the background DAD to support seamless streaming services in VANETs. It reduces the handover delay caused by the Duplicate Address Detection (DAD) since it continuously maintains the original CoA (oCoA) configured at original Access Router (oAR). In addition, since the vehicle creates a new nCoA at the intersection, it reduces the number of Home Agent (HA) binding updates. Furthermore, it reduces the DAD (Duplicate Address Detection) delay because when performing DAD procedure to create a new nCoA at intersections, the DAD procedure is performed as a background process while still using the oCoA.

What is claimed is:
1. A lossless handover method in vehicular wireless networks, the method comprising a handover process of per- forming handover at road-sections using an original Care-of-Address (oCoA) configured at an original access router (oAR) to which a vehicle (a mobile node) first belongs when the vehicle initiates communication in a wireless network, and performing, at intersections, duplicate address detection (DAD) for a new Care-of-Address (nCoA) caused by a change in access routers (ARs) as a background process,
  wherein the handover process includes a road-section handover process of performing, at the vehicle, communication while moving at high speed by configuring the oCoA for communication by access with the oAR through the wireless network, and performing handover to a changed access router (AR) using the oCoA at road-sections,
  wherein the handover process includes an intersection handover process of implementing the DAD for the nCoA for communication with an AR to be changed as a background process while performing communication using the oCoA at intersections, and performing handover using the nCoA when the nCoA is usable,
  wherein the road-section handover process includes:
  configuring, at the vehicle, the oCoA for communication by accessing the oAR, judging that handover is initiated when sensing that a signal of an access point (AP) within the oAR becomes weak while performing communication, and transmitting a modified Router Solicitation message for proxy (mRtSoIPr) to the oAR;
  receiving, at the oAR, a response message, and requesting the oAR to store data by transmitting a message indicating a last packet to the oAR when the vehicle escapes a management area of the oAR;
  if a link up message indicating that a signal of a new access router (nAR) is sensed is received, transmitting a modified Unsolicited Neighbor Advertisement message (mUNA) including the oCoA which has been used in the oAR to the nAR; and
  requesting, at the nAR receiving the mUNA, the oAR to transmit the stored data to the vehicle.

2. The lossless handover method according to claim 1, wherein the road-section handover includes performing handover to the nAR using the oCoA.

3. A lossless handover method in vehicular wireless networks, the method comprising a handover process of performing handover at road-sections using an original Care-of-Address (oCoA) configured at an original access router (oAR) to which a vehicle (a mobile node) first belongs when the vehicle initiates communication in a wireless network, and performing, at intersections, duplicate address detection (DAD) for a new Care-of-Address (nCoA) caused by a change in access routers (ARs) as a background process,
  wherein the handover process includes a road-section handover process of performing, at the vehicle, communication while moving at high speed by configuring the oCoA for communication by access with the oAR through the wireless network, and performing handover to a changed access muter (AR) using the oCoA at road-sections,
  wherein the handover process includes an intersection handover process of implementing the DAD for the nCoA for communication with an AR to be changed as a background process while performing communication using the oCoA at intersections, and performing handover using the nCoA when the nCoA is usable,
  wherein the intersection handover process includes:
  configuring, at a vehicle, the CoA for communication by accessing the oAR, judging that handover is initiated when sensing that a signal of an access point (AP) within the oAR becomes weak while performing communication, and transmitting a modified Router Solicitation message for proxy (mRtSoIPr) to the oAR;
  receiving, at the oAR, a response message, and requesting the oAR to store data by transmitting a message indicating a last packet to the oAR when the vehicle escapes a management area of the oAR;
  if a link up message indicating that a signal of a new access router (nAR) is sensed is received, transmitting a modified Unsolicited Neighbor Advertisement message (mUNA) including the oCoA which has been used in the oAR to the nAR;
  requesting, at the nAR receiving the mUNA, the oAR to transmit the stored data to the vehicle; and
  performing, at the vehicle, communication with the nAR using the oCoA, performing the DAD for the nCoA as a background process, and registering the nCoA to a home agent.

4. The lossless handover method according to claim 3, wherein the intersection handover includes performing handover to the nAR using the nCoA.

* * * * *